G. BARTLETT.
Plow.
No. 4,976. Patented Feb. 20, 1847.
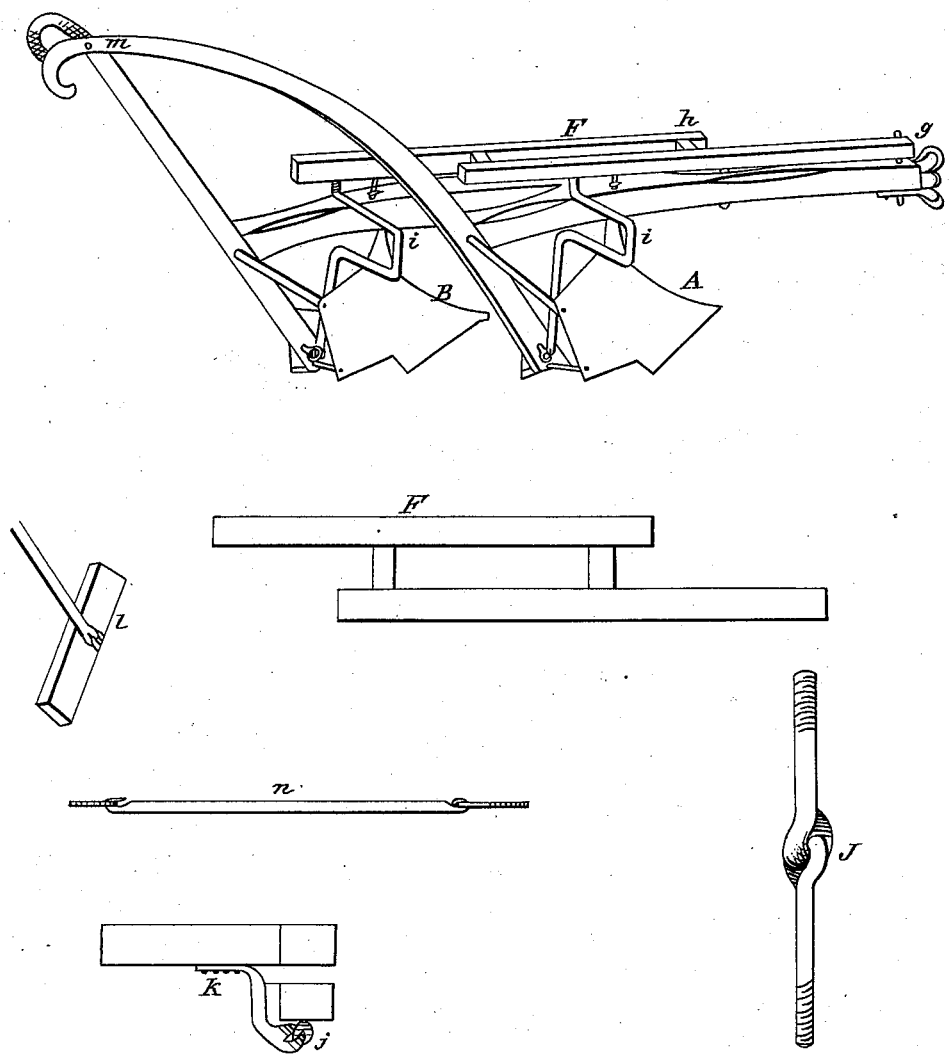

UNITED STATES PATENT OFFICE.

GEORGE BARTLETT, OF SMITHFIELD, RHODE ISLAND.

IMPROVEMENT IN PLOWS.

Specification forming part of Letters Patent No. 4,976, dated February 20, 1847.

*To all whom it may concern:*

Be it known that I, GEORGE BARTLETT, of Smithfield, in the county of Providence and State of Rhode Island, have invented, constructed, made, and applied to use a new and useful Improvement in the Mode of Connecting Plows Together, called "George Bartlett's Improved Plow;" and my said invention or improvement is by me plainly and fully specified in the words and figures following, to wit:

Reference being had to the annexed drawings, two plows, A and B, of the ordinary construction, (or differing from the ordinary construction in having but one handle each, and that on the landside of the plow, the handle of the forward plow, A, of such length and form as to be even with the handle of the back plow, B,) are connected together by means of a frame and iron joints in the manner described as follows:

A frame is made, in the form represented in Figure F, of four sticks of timber three inches by four in size. Two of these sticks, each two and a half feet in length, are joined together by two others, each of a length equal to the width of the furrow which one plow will cut, firmly mortised into the two long sticks at right angles with them. The forward part of the frame is attached to the plow A at $g$, near the end of the beam, by two iron bolts connected by a joint, as represented by the drawing J, the joint being on the upper side of the beam. The back part of the frame is connected with the same plow, A, by means of the long iron rod $i$, three-fourths of an inch in diameter, bent as represented in the drawings, so as to allow the plow to roll. This long bent rod is connected by a joint to a short bolt, which passes through the lower end of the plow-handle.

The forward part of the near-side piece of the frame is attached to the back plow, B, at $h$, near the end of the beam, by means of a joint, as represented in the drawings, K J. This joint is formed of two pieces of iron, one fastened firmly to the lower side of the frame by screws or bolts, and so bent as to pass down below the beam and allow the beam to roll. A bolt connected with this rod of iron by a joint immediately below the beam passes up through the beam, and is secured by a nut on the upper side of the beam. As the team must be attached to the back plow at a point lower than that to which it is attached to the forward plow, this joint is thus located to place it near the line of draft. If, therefore, from any cause, the team is connected with the back plow at a point above the middle of the beam, the joint should be constructed as described for the forward plow and placed on the upper side of the beam. The back part of the frame is attached to the plow B in the same manner as to the plow A.

When plows of the ordinary construction are used the bent rods at the back part of the frame may be connected with the plows by means of a joint, as represented at $l$.

The handles are connected at $m$ by means of a stiff rod with a joint at each end, as represented in the drawing $n$.

The team is attached to the middle of a chain, which is hooked at the ends into the two shackles at the ends of the beams.

The point of the back plow, B, should be even with the back part of the forward plow, A.

When more than two plows are used the width of the frame is increased, and the additional plows are connected with it in the same manner as those already described.

For marking or furrowing ground to plant, the frame is made of suitable width, and the plows may be placed even with each other, or at the same distance from the team.

I claim—

The location of the joints near the line of draft, or, in other words, near the axis about which the plow should, and ordinarily does, revolve when rolled for the purpose of guiding it.

In testimony that the foregoing is a true specification of my said improvement I have hereunto set my hand this 1st day of February, in the year of our Lord 1847.

GEORGE BARTLETT.

In presence of—
NATHAN STEVENS,
WILLARD SAYLES.